UNITED STATES PATENT OFFICE.

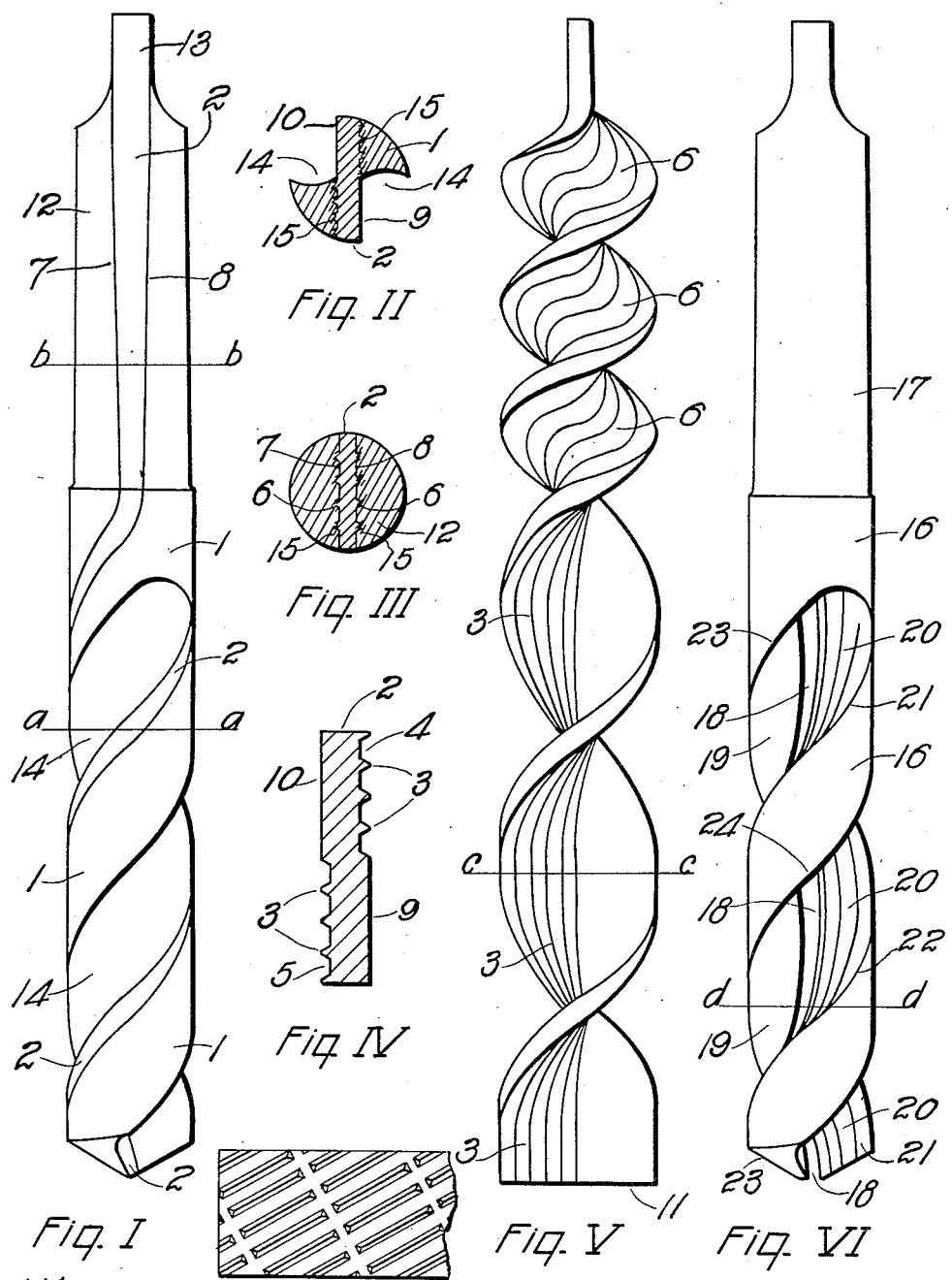

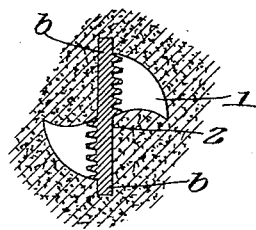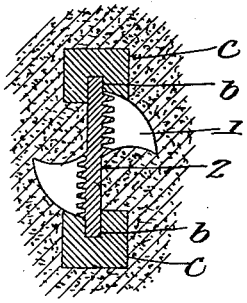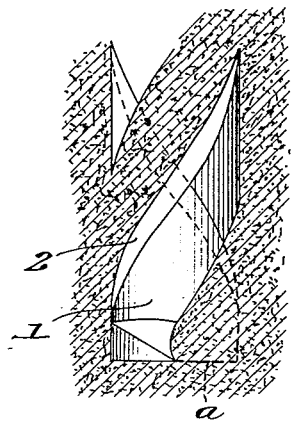

CHRISTIAN F. HEINKEL, OF CLEVELAND, OHIO.

METHOD OF CONSTRUCTING COMPOSITE STRUCTURES.

1,186,094. Specification of Letters Patent. Patented June 6, 1916.

Application filed July 14, 1911. Serial No. 638,507.

*To all whom it may concern:*

Be it known that I, CHRISTIAN F. HEINKEL, a citizen of the United States, residing at Cleveland, in the county of Cuyahoga and State of Ohio, have invented a new and useful Method of Constructing Composite Structures, of which the following is a specification.

My invention relates to improvements in construction of articles composed of a plurality of parts.

The object of my invention is, to provide a method whereby the parts of a structure can be joined or united permanently and rigidly, and without any auxiliary means such as screws, or wedges, or other means. I attain this object by providing fins on one or more of the parts to be joined or united, and contacting said parts, and applying heat so that said fins fuse and the so fused portions of said parts unite and form a permanent and rigid bond after cooling.

Heretofore a large number of articles have been constructed of a plurality of parts, and such parts were fitted together and secured or fastened by means of screws, or wedges, or similar means. Attempts have been made to hold such parts together or in place by means of casting, or in other words, by means of casting one or more parts to one or more other parts, so that the shrinking action of the casting may hold the first mentioned parts in place. Such procedure eliminates fitting and fastening of the parts, but such construction is not permanent because the parts become loose by wear or use. Other procedures have also been attempted, such as welding by electricity or otherwise, but such procedures are cumbersome and expensive. It will be seen that, with this invention, the union or joint is produced easily and cheaply since the fins require less heat for fusing than a flat surface, and, in addition, produce a better joint and the parts can not become loose without fracture at the joint of such parts.

My invention is sufficiently illustrated in the accompanying drawings which disclose a twist-drill constructed according to this invention. This illustration of a twist-drill is purposely selected to show that complicated and irregular-shaped articles can easily be produced by my invention, and it is obvious that other complicated and irregular articles, as well as less complicated and irregular ones, can be produced by my invention with suitable modifications. I, therefore, do not limit myself to the precise details set forth in said drawings and the following specification.

In said accompanying drawings: Figure I is a general side-view of a twist-drill as it appears when finished and showing the cutting-blade extending into the shank and forming the tang. Fig. II is a section on line *a—a* of Fig. I and shows the fins partially fused and united with the body-material. Fig. III is a section on line *b—b* of Fig. I and also shows the fins partially fused and united with the shank-material. Fig. IV is a section, on a larger scale, of a cutting-blade, taken on line *c—c* of Fig. V. Fig. V is a general side-view of a cutting-blade as it appears before being placed in position in the mold or drill. Fig. VI is a general side-view of a drill-body before cutting-blade is in place and shows the slit and fins on the body. Fig. VII shows a portion of a cutter with interrupted fins. Fig. VIII is a partial section through a mold before casting, showing the cutter in place in the side core-prints. Fig. IX is a partial section through a mold before casting, showing the cutter in place in the chill. Fig. X is a partial section through a mold before casting, showing the cutter in place in the core-prints at the point of the drill.

Similar reference characters refer to similar parts throughout the several views.

The general principle of this invention is to provide fins on one or more of the parts to be united and apply heat so that said fins fuse and the so fused materials unite and a bond is produced between said parts after cooling. There are many procedures whereby the above can be accomplished, but, in this specification, I will describe my preferred application of this invention to two procedures as applied to a twist-drill, and other procedures should be obvious.

Figs. I, II, and III represent a twist-drill constructed according to this invention and has body 1 cast to cutter-blade 2. Any method known to the art pertaining to the production of castings may be employed for the casting operation, and all detailed steps of such operation need not be set forth here. The only difference between casting this drill and a cored casting is the insertion into the mold of cutter-blade 2 instead of a core, Cutter-blade 2, which, in this instance, is inserted into the mold similar to a core in a cored casting, is provided with fins 3 on faces 4 and 5, and with fins 6 on faces 7 and 8; all fins 3 and 6 should be so proportioned, as to cross-section, that the heat of the molten body-material will fuse them. Said fins are represented by single lines in Fig. V and are shown continuous, but it is obvious that they may be interrupted by cross-cutting at intervals which is shown in Fig. VII. Faces 9 and 10 are the cutting-faces and, in this instance, have no fins. The front end of cutter-blade 2 is, preferably, square similar to end 11 of cutter blade shown in Fig. V, for the purpose of forming a core-print and assisting the location of cutter-blade 2 in the mold as will appear hereinafter. If the drill is to be finished after casting, cutter-blade 2 and body 1 and shank 12 should be made somewhat larger to permit such finishing. Tang 13 may also form a core-print similar to end 11. After said fins are produced upon said faces, cutter-blade 2 is twisted as required, and appears similar to Fig. V. The upper or shank-portion of cutter-blade 2 may be straight as shown in Fig. I, or twisted as shown in Fig. V. A mold is now made which meets the requirements as to fusing of the fins and form of the body. The cutter-blade 2, being made square at the front end in this instance, is inserted into this mold similar to a core in a cored casting and rests in and is located by core-prints in the mold as seen at $a$ in Fig. X. In this instance, the cutter-blade 2 does not project outside of the sides of the body but, having a square end while the mold for the body is beveled or pointed at the bottom, two triangular portions of the cutter-blade project outside of the pointed portion of the mold and into core-prints, whereby the cutter-blade is located properly in the mold. The molten-material is now poured into said mold and the casting removed from said mold and finished as required. The casting may also be removed from said mold as soon as it is sufficiently set and while still sufficiently hot from the casting-operation to properly harden said cutter-blade and be subjected to a suitable cooling-means whereby said cutter-blade may be hardened. It will be seen that, when pouring the molten material into said mold, said fins become heated to a fusing point while the molten material is still in a fused condition, the two materials will mix or unite as indicated at 15 (Figs. II and III) and form a permanent bond after cooling. If no fins were provided the mold and cutter-blade would absorb most of the heat of the molten material before the surface of the cutter-blade would be fused and no permanent joint would be produced. For the purpose of holding the cutter-blade 2 more firmly in the mold, the cutter-blade 2 may be made wider than necessary for the drill proper. This additional width of the cutter-blade 2 should rest in core-prints provided in the mold as seen at $d$ in Fig. VIII and extend along the entire length of the cutter-blade 2. The pattern with which the mold is made should be made accordingly. A suitable flux may be applied to the surface of cutter-blade 2 so that the molten material may run closely to the cutter-blade 2 between the fins 3 and 6; said fins themselves need no flux since they will be fused.

The herein described method of making the casting is illustrative or suggestive only and by no means the only method of making a casting; it is, therefore, understood that the casting operation may be accomplished by any of the methods known to the casting art.

Fig. VI represents a twist-drill body 16 which is, preferably, made of a rather soft and flexible material such as machinery steel and has shank 17, slit 18, and flutes 19 which are similar to flutes 14. A cross-section on line $d$—$d$ will appear as Fig. II without cutter-blade 2. I prefer to cut a series of fins 20 on faces 21 and 22. Said fins are represented by single lines and are similar to fins 3 and 6 as to cross-section; a detailed description of which has previously been given. Faces 23 and 24 are without fins and form one wall of flutes 19.

A cutter-blade is prepared and formed as previously set forth but without the shank portion and of sufficient length and width to fill slit 18. The so prepared cutter-blade is inserted into slit 18 and held against faces 21 and 22 by any suitable means, and, preferably, so that fins 20 meet the fins on said cutter-blade. Heat is now applied, preferably to said cutter-blade, by any suitable means as for instance by an electric current or a torch. In case electricity is used for heating, one electrode is applied to said cutter-blade and the other one to body 16. The electric current will then arc across an air-gap between said cutter-blade and body 16 whereby an intense heat may be produced at the juncture of said parts. Sufficient electric current must, of course, be used to produce the desired temperature. When insufficient electric current is used, the resistance of the parts to be united may allow the current to pass through without heating the parts properly except, possibly, at the points of the fins. In short, the electric current should be heavy enough, in relation to the resistance of the parts to be attached, to properly heat said parts. I prefer to locate the fins substantially parallel with the line of most shrinkage of the parts while they are cooling. For instance, the cutter-blade 2 has fins longitudinally thereof, the materials shrink most in that direction when cooling and, by locating the fins as stated, internal strains or possible fractures of the parts are mitigated. In any case of heating, said fins should fuse so that the so fused material may unite and form a permanent bond after cooling. The spaces which may form between said fins may be filled with spelter or other similar material which may conveniently be done while the drill is hot from the joining operation. When casting one of the parts the molten material will fill such spaces and no additional operation is necessary for that purpose. While applying heat for said joining operation, the cutter-blade also becomes heated and such heating may be carried to a temperature sufficiently high to harden said cutter-blade, thus uniting the parts and hardening said cutter-blade with one heating. The drill may now be finished as necessary. It is obvious that a drill similar to Fig. VI, with shank and tang solid, may be cast to a cutter-blade which, in such a case, needs to extend along the fluted portion of the drill only.

When the bulk of the material of the parts to be joined or united is small, or, if for any reason, as for instance a low fusing-temperature of one or more of said materials, said fins may not fuse readily, said fins may either be made thinner or smaller in cross-section than shown in the drawings, or material may be added to the body-portion of said parts and, if necessary, cut away after said parts are joined. For instance, in the drill shown in Figs. I, II and III, if the molten material in body 1 does not radiate sufficient heat to fuse fins 3 and 6 when cast with flutes 14, either said fins may be reduced in cross-section, or the drill may be cast solid, without flutes 14, and said flutes cut into the drill afterward.

When a structure is composed of parts, the body-portion of one or more of which may be affected detrimentally by the heat which fuses the fins, a chill may be placed over such parts so that the heat may be concentracted at the fins and eliminated from the body-portion of said parts which may be affected detrimentally. For instance, the cutter-blade 2 may be positioned in the chills c as seen at b in Fig. IX. In this instance, the chills may extend along the entire length of the cutter-blade 2. The application of chills is well known in the art and needs no detailed description here.

It will be seen that, with this invention, a permanent and solid or rigid joint is produced and that any article, composed of a plurality of parts and which parts are susceptible to a heat treatment can be joined by this invention; for instance any of the articles disclosed in my Patents No. 1022135, dated Apr. 2, 1912, or No. 1043831 dated Nov. 12, 1912, or No. 1090533, dated Mch. 14, 1914.

I claim:

1. The method of joining adjacent members of a composite structure and hardening the same, which method consists in forming a series of fins on one of the members, in casting the other member onto the first mentioned member whereby the fins are fused and a portion of the material of the first mentioned member is mixed and united with a portion of the material of the second mentioned member, and in hardening one or both members by means of the heat of the casting operation.

2. The method of joining adjacent members of a composite structure, and hardening the same, which method consists in forming a series of fins between the adjacent members, in fusing the fins and causing a portion of the material of one member to mix and unite with a portion of the material of the other member, and in hardening one or both members by means of the heat from the fusing operation.

3. The method of joining a cutter to the body of a cutting tool and hardening the same, which method consists in forming the cutter, in providing a series of fins at the juncture of the cutter and the body, in fusing the fins and causing a portion of the cutter material to mix and unite with a portion of the adjacent body material, and hardening the cutter by means of the heat from the fusing operation.

4. The method of joining the cutter of a twist drill to the drill body, which method consists in forming the cutter, in providing a series of fins at the juncture of the cutter and the body, in fusing the fins and causing a portion of the cutter material to mix and unite with a portion of the body material.

5. The method of joining a cutter to the body of a drill and hardening the same, which method consists in forming the cutter, in providing a series of fins at the juncture of the cutter and the body, in fusing the fins and causing a portion of the cutter material to mix and unite with a portion of the body material, and in hardening the drill by means of the heat from the fusing operation.

6. The method of constructing a drill, which method consists in forming the cutter, in providing a series of fins at the juncture of the cutter and the body, in fusing the fins and causing a portion of the cutter material to mix and unite with a portion of the body material, in hardening the drill by means of the heat from the fusing operation, and in finishing the drill.

7. The method of constructing a drill, which method consists in forming the cutter and providing a series of fins on those surfaces thereof which contact the body, in constructing a mold suited to the required shape of the cast drill body and adapted to receive the cutter similar to a core in an ordinary cored casting and further adapted to divert excessive heat from the cutter while casting the body, in placing the cutter into the mold, in pouring the casting and fusing the fins and causing the so fused fin material to mix and unite with a portion of the body material, in hardening the drill by means of the heat from the casting operation, and in finishing the drill.

CHRISTIAN F. HEINKEL.

Witnesses:
ELMER G. ESSIG,
HENRY R. SYDOW.